(12) United States Patent
Biedermann (10) Patent No.: US 6,389,292 B2
(45) Date of Patent: May 14, 2002

(54) METHOD AND TELECOMMUNICATION INTERFACE FOR THE TRANSMISSION OF CONTINUOUS AND/OR DISCONTINUOUS DATA STREAMS IN A HYBRID TELECOMMUNICATION SYSTEM PARTICULARLY AN "ISDN <-> DECT SPECIFIC RLL/WLL" SYSTEM

(75) Inventor: Rolf Biedermann, Ahaus-Ottenstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/284,099

(22) PCT Filed: Oct. 14, 1997

(86) PCT No.: PCT/DE97/02352

§ 371 Date: Apr. 7, 1999

§ 102(e) Date: Apr. 7, 1999

(87) PCT Pub. No.: WO98/18277

PCT Pub. Date: Apr. 30, 1998

(30) Foreign Application Priority Data

Oct. 23, 1996 (DE) ......................................... 196 43 774

(51) Int. Cl.[7] ................................................ H04Q 7/20
(52) U.S. Cl. ...................... 455/462; 455/426; 455/451; 455/452; 370/424; 370/463; 370/469; 370/493
(58) Field of Search .................................. 455/454, 450, 455/451, 462, 426, 507–509, 452; 370/264, 265, 328, 358, 423, 424, 460, 463, 469, 493, 543

(56) References Cited

U.S. PATENT DOCUMENTS

| | | | | |
|---|---|---|---|---|
| 5,555,260 A | * | 9/1996 | Rinnback et al. | 455/33.1 |
| 5,559,796 A | * | 9/1996 | Eem et al. | 370/60 |
| 5,654,969 A | * | 8/1997 | Wilhelmsson | 370/460 |
| 5,668,880 A | * | 9/1997 | Alajajian | 455/33.1 |
| 5,802,046 A | * | 9/1998 | Scott | 455/34.1 |
| 6,081,534 A | * | 6/2000 | Sipila | 455/426 |

* cited by examiner

Primary Examiner—William Trost
Assistant Examiner—Simon Nguyen
(74) Attorney, Agent, or Firm—Bell Boyd & Lloyd LLC (57) ABSTRACT

In order to be able to transmit continuous and/or discontinuous data streams in a hybrid telecommunication system, particularly a "ISDN⇌DECT-specific RLL/WLL" system, given minimal technical outlay, for example with respectively separate data ports (data inputs and data outputs), a plurality of second telecommunication channels (for example, DECT channels) adapted to the analyzed data transmission situation is respectively set up dependent on the analysis of the data transmission situation on a first telecommunication channel or, respectively, channels (for example, the ISDN B-channel or, respectively, B-channels).

12 Claims, 5 Drawing Sheets

METHOD AND TELECOMMUNICATION INTERFACE FOR THE TRANSMISSION OF CONTINUOUS AND/OR DISCONTINUOUS DATA STREAMS IN A HYBRID TELECOMMUNICATION SYSTEM PARTICULARLY AN "ISDN <--> DECT SPECIFIC RLL/WLL" SYSTEM

BACKGROUND OF THE INVENTION

In message systems with a message transmission link between a message source and a message sink, transmission and reception devices are employed for the message processing and transmission, whereby 1) the message processing and message transmission can ensue in a privileged transmission direction (simplex mode) or in both transmission directions (duplex mode), 2) the message processing is analog or digital, 3) the message transmission via the long-distance transmission link is wire-bound or ensues wirelessly on the basis of various message transmission methods FDMA (Frequency Division Multiple Access) and/or CDMA (Code Division Multiple Access)—for example according to radio standards such as DECT, GSM, WACS or PACS, IS-54, PHS, PDC, etc. (see IEEE Communications Magazine, January 1995, pages 50 through 57; D. D. Falconer et al., "Time Division Multiple Access Methods for Wireless Personal Communication")

"Message" is a higher-ranking term that stands both for the signification (information) as well as for the physical representation (signal). Despite the same signification of a message—i.e. the same information—, different signal forms can occur. Thus, for example, a message relating to a subject matter can be transmitted (1) in the form of an image, (2) as spoken word, (3) as written word, (4) as encrypted word or image.

The transmission mode according to (1) . . . (3) is thereby normally characterized by continuous (analog) signals, whereas discontinuous signals (for example pulses, digital signals) usually arise given the transmission mode according to (4).

Proceeding from this general definition of a message system, the invention is directed to a method and telecommunication interface for the transmission of continuous and/or discontinuous data streams in a hybrid telecommunication system, particularly an "ISDN⇌DECT-specific RLL/WLL" system.

Figure 1:
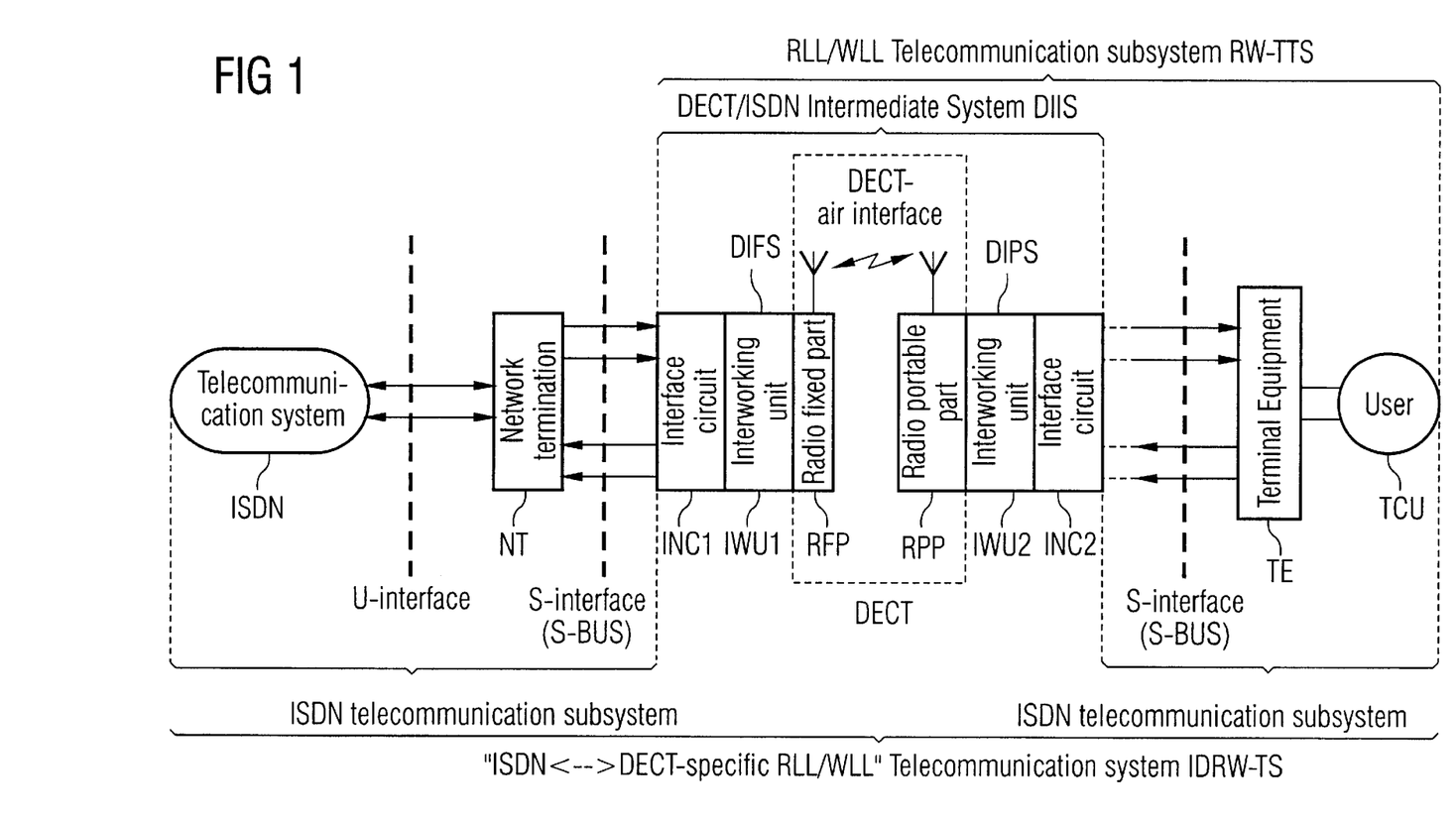
FIG. 1 depicts an ISDN-DECT-specific RLL/WLL telecommunication system.

Standing for the multitude of hybrid telecommunication systems, FIG. 1, proceeding from the publications "*Nachrichtentechnik Elektronik, Berlin* 45 (1995) No. 1, pages 21 through 23 and No. 3, pages 20 and 30" as well as *IEE Colloquium* 1993, 173; (1993), pages 29/1–29/7; W. Hing, F. Halsall, "*Cordless access to the ISDN basic rate service*", shows an "ISDN⇌DECT-specific RLL/WLL" telecommunication system IDRW-TS (Integrated Services Digital Network⇌Radio in the Local Loop/Wireless in the Local Loop) on the basis of a DECT/ISDN Intermediate Systems DIIS according to the *ETSI Publication prETS* 300xxx, Version 1.10, September 1996, with an ISDN telecommunication sub-system I-TTS (see the publication "*Nachrichtentechnik Elektronik, Berlin* 41–43, Part: 1 through 10, P1: (1991) No. 3, pages 99 through 102; P2: (1991) No. 4, pages 138 through 143; P3: (1991) No. 5, pages 179 through 182 and No. 6, pages 219 through 220; P4: (1991) No. 6, pages 220 through 222 and (1992) No. 1, pages 19 through 20; P5: (1992) No. 2, pages 59 through 62 and (1992) No. 3, pages 99 through 102; P6: (1992) No. 4, pages 150 through 153; P7: (1992) No. 6, pages 238 through 241; P8: (1993) No. 1, pages 29 through 33; P9: (1993) No. 2, pages 65 through 97 and (1993) No. 3, pages 129 through 135; P10: (1993) No. 4, pages 187 through 190") and a DECT-specific RLL/WLL telecommunication sub-system RW-TTS.

The DECT/ISDN intermediate system DIIS or, respectively, the RLL/WLL telecommunication sub-system RW-TTS is thereby preferably based on a DECT/GAP system DGS (Digital Enhanced (previously: European) Cordless Telecommunication; see (1): Nachrichtentechnik Elektronik 42 (1992) January/February No. 1, Berlin, DE; U. Pilger, "Struktur des DECT-Standards" pages 23 through 29 in conjunction with the ETSI Publication ETS 300175-1 . . . 9, October 1992; (2): Telcom Report 16 (1993), No. 1, J. H. Koch, "Digitaler Komfort für schnurlose Telekommunikation—DECT-Standard eröffnet neue Nutzungsgebiete", pages 26 and 27; (3): tec 2/93—the technical magazine of Ascom, "Wege zur universellen mobilen Telekommunikation", pages 35 through 42; (4): Philips Telecommunication Review, Vol. 49, No. 3, September 1991, R. J. Mulder, "DECT, a universal cordless access system"; (5) WO 93/21719 (FIGS. 1 through 3 with appertaining description)). The GAP standard (Generic Access Profile) is a subset of the DECT standard that has the job of assuring the interoperability of the DECT air interface for telephone applications (see *ETSI Publication prETS* 3000444, April 1995).

Alternatively, the DECT/ISDN intermediate system DIIS or, respectively, the RLL/WLL telecommunication sub-system RW-TTS can also be based on a GSM system (Groupe Spéciale Mobile or Global System for Mobile communication; see Informatik Spektrum 14 (1991) June, No. 3, Berlin, DE; A. Mann, "Der GSM-Standard—Grundlage für europäische Mobilfunknetze", pages 137 through 152). Instead, it is also possible in the framework of a hybrid telecommunication system that the ISDN telecommunication sub-system I-TTS is fashioned as GSM system.

Coming into consideration over and above this as further possibilities for the realization of the DECT/ISDN intermediate system DIIS or, respectively, RLL/WLL telecommunication sub-system RW-TTS or of the ISDN telecommunication sub-system I-TTS are the initially cited systems as well as future systems that are based on the known multiple access methods FDMA, TDMA, CDMA (Frequency Division Multiple Access, Time Division Multiple Access, Code Division Multiple Access) and hybrid multiple access methods formed therefrom.

The employment of radio channels (for example, DECT channels) in classic, line-bound telecommunication systems such as the ISDN is gaining in significance, particularly as viewed in front of the background of future, alternative network operators without their own complete wire network.

For example, ISDN services are to be made available to the ISDN subscriber at standard ISDN interfaces based on the wireless connection technology RLL/WLL (Radio in the Local Loop/Wireless in the Local Loop) given the RLL/ WLL telecommunication sub-system RW-TTS, for example upon involvement of the DECT system DS (see FIG. 1).

In the "ISDN⇌DECT-specific RLL/WLL" telecommunication system IDRW-TS of FIG. 1, a telecommunication subscriber (user) TCU (Tele-Communication User) has his terminal equipment TE (Terminal Endpoint; Terminal Equipment) linked into the ISDN world with the services available therein, for example via a standardized S-interface (S-BUS) the DECT/ISDN intermediate system DIIS (first telecommunication sub-system)—preferably DECT-specific and contained in the RLL/WLL telecommunication sub-system RW-TTS—fashioned as local message transmission loop, a further standardized S-interface (S-BUS), a network termination NT (Network Termination) and a standardized U-interface of the ISDN telecommunication sub-system I-TTS (second telecommunication sub-system).

The first telecommunication sub-system DIIS is composed essentially of two telecommunication interfaces, a first telecommunication interface DIFS (DECT Intermediate Fixed System) and a second telecommunication interface DIPS (DECT Intermediate Portable System) that are wirelessly connected to one another, for example via a DECT air interface. Due to the quasi location-bound first telecommunication interface DIFS, the first telecommunication sub-system DIIS forms the local message transmission loop defined above in this context. The first telecommunication interface DIFS contains a radio fixed part RFP (Radio Fixed Part), an interworking unit IWU1 (InterWorking Unit) and an interface circuit INC1 (INterface Circuitry) to the S-interface. The second telecommunication interface DIPS contains a radio portable part RPP (Radio Portable Part) and an interworking unit IWU2 (InterWorking Unit) and an interface circuit INC2 (INterface Circuitry) to the S-interface. The radio fixed part RFP and the radio portable part RPP thereby form the known DECT/GAP system DGS.

Figure 2:
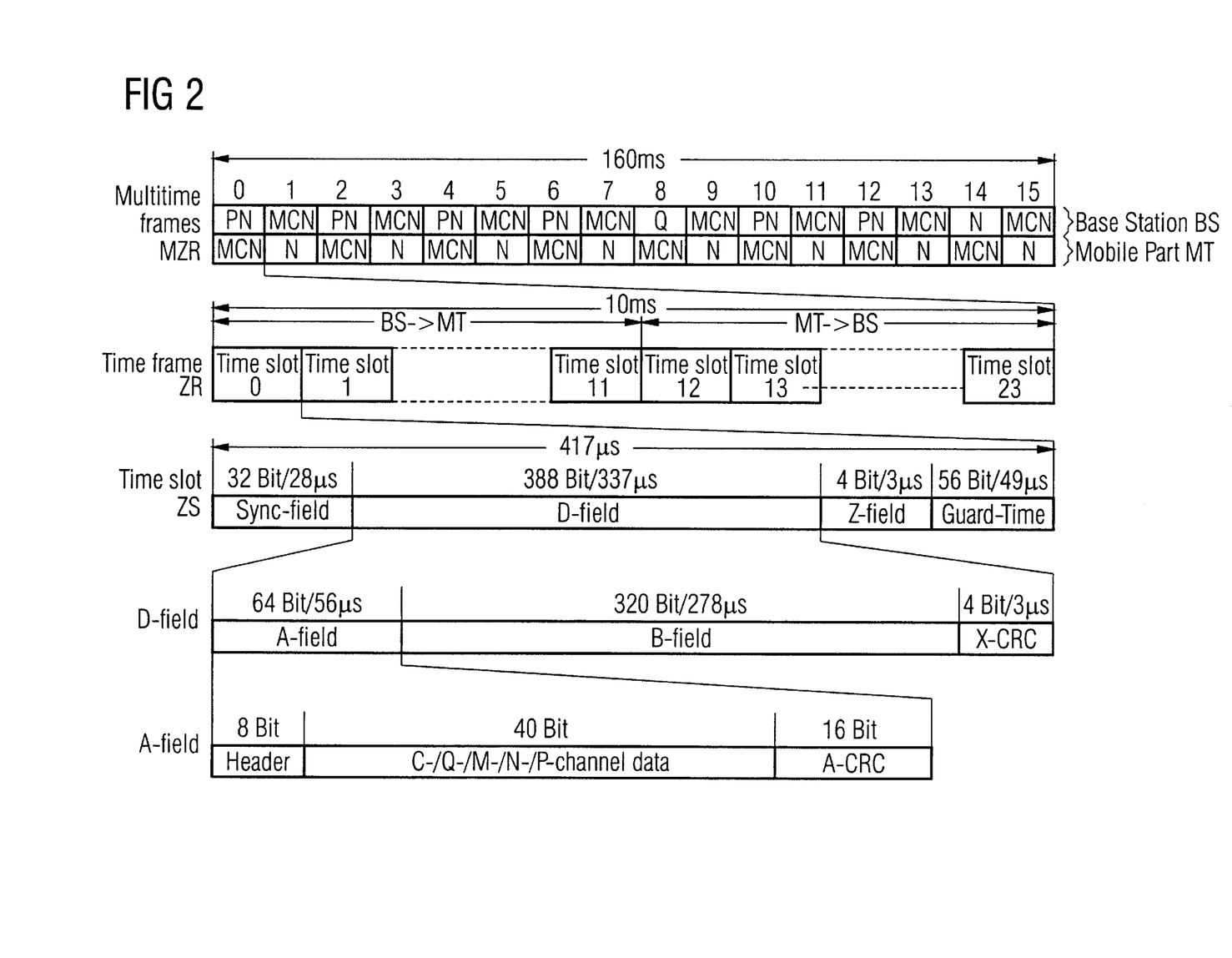
FIG. 2 depicts a TDMA principle for sending radio messages in predetermined time sequences.

Based on the publication "Nachrichtentechnik Elektronik 42 (1992) January/February, No. 1, Berlin, DE; U. Pilger, "Struktur des DECT-Standards", pages 23 through 29 in combination with ETS 300 175-1 . . . 9, October 1992", FIG. 2 shows the TDMA structure of a DECT/GAP system. The DECT/GAP system is a hybrid system with respect to the multiple access methods wherein radio messages according to the TDMA principle of FIG. 2 can be sent in a predetermined time sequence from the base station RFP to the mobile part RPP and from the mobile part RPP to the base station RFP on ten frequencies in the frequency band between 1.88 and 1.90 GHz according to the FDMA principle. The time sequence is thereby defined by a multi-timeframe MZR that occurs every 160 ms and comprises 16 timeframes ZR having a respective time duration of 10 ms. Information that relate to a C, M, N, P, Q channel defined in the DECT standard are separately transmitted to base station RFP and mobile part RPP in these time frames ZR. When information for a plurality of channels are transmitted in a time frame ZR, then the transmission ensues according to a priority list with M>C>N and P>N. Each of the 16 time frames ZR of the multi-timeframe MZR is in turn subdivided into 24 time slots each having a respective time duration of 417 µs, whereof 12 time slots ZS (time slots 0 . . . 11) are intended for the transmission direction "base station RFP→mobile part RPP" and another 12 time slots ZS (time slots 12 . . . 23) are intended for the transmission direction "mobile part RPP→base station RFP". According to the DECT standard, information having a bit length of 480 bits are transmitted in each of these time slots. Of these 480 bits, 32 bits are transmitted as synchronization information in a SYNC field and 388 bits are transmitted as payload information in a D-field. The remaining 60 bits are transmitted as auxiliary information in a Z-field and as protection information in a "guard time" field. The 388 bits transmitted as payload information are in turn subdivided into an A-field 64 bits long, a B-field 320 bits long and an "X-CRC" word that is 4 bits long. The 64 bit long A-field is composed of an 8 bit long data header (header), a 40 bit long data set with data for the C, Q, M, N, P channels and a 16 bit long "A-CRC" word. The DECT transmission structure shown in FIG. 2 is referred to as "full slot format". A "double slot format" is additionally defined in the DECT standard (see WO 93/21719).

Figure 3:
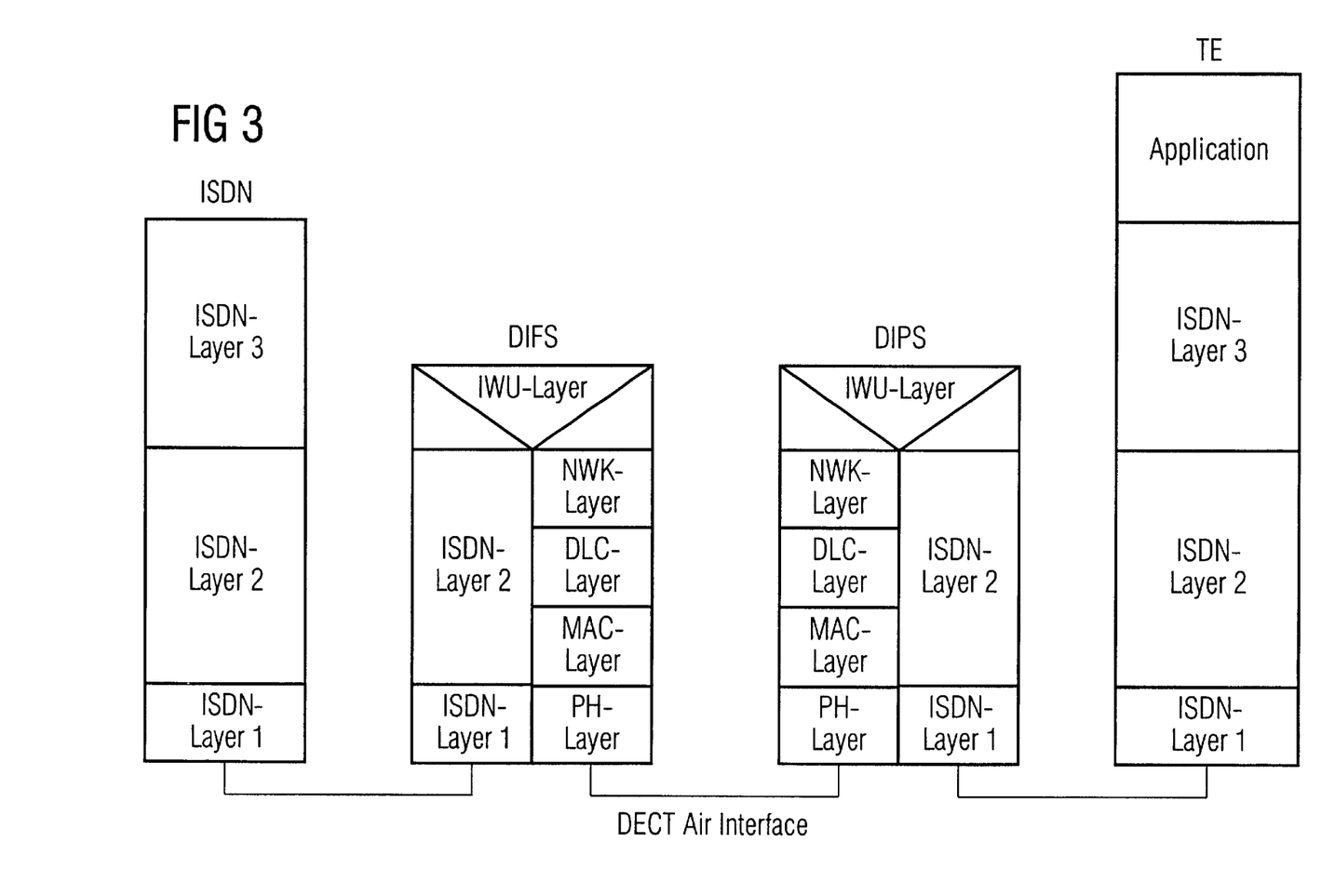
FIG. 3 depicts a model of the C-level of the ISDN-DECT-specific RLL/WLL telecommunication system of FIG. 1.

On the basis of the OSI/ISO layer model (see (1): *Unterrichtsblätter—Deutsche Telekom,* Vol. 48, February 1995, pages 102 through 111; (2): *ETSI publication ETS* 300175-1 . . . 9. October 1992; (3): *ETSI publication ETS* 300102, February 1992; (4): *ETSI publication ETS* 300125, September 1991; (5): *ETSI publication ETS* 300012, April 1992), FIG. 3 shows a model of the C-level of the "ISDN⇆DECT-specific RLL/WLL" telecommunication system IDRW-TS of FIG. 1 (see *ETSI publication prETS* 300xxx, Version 1.10, September 1996, Ch. 5, FIG. 3).

Figure 4:
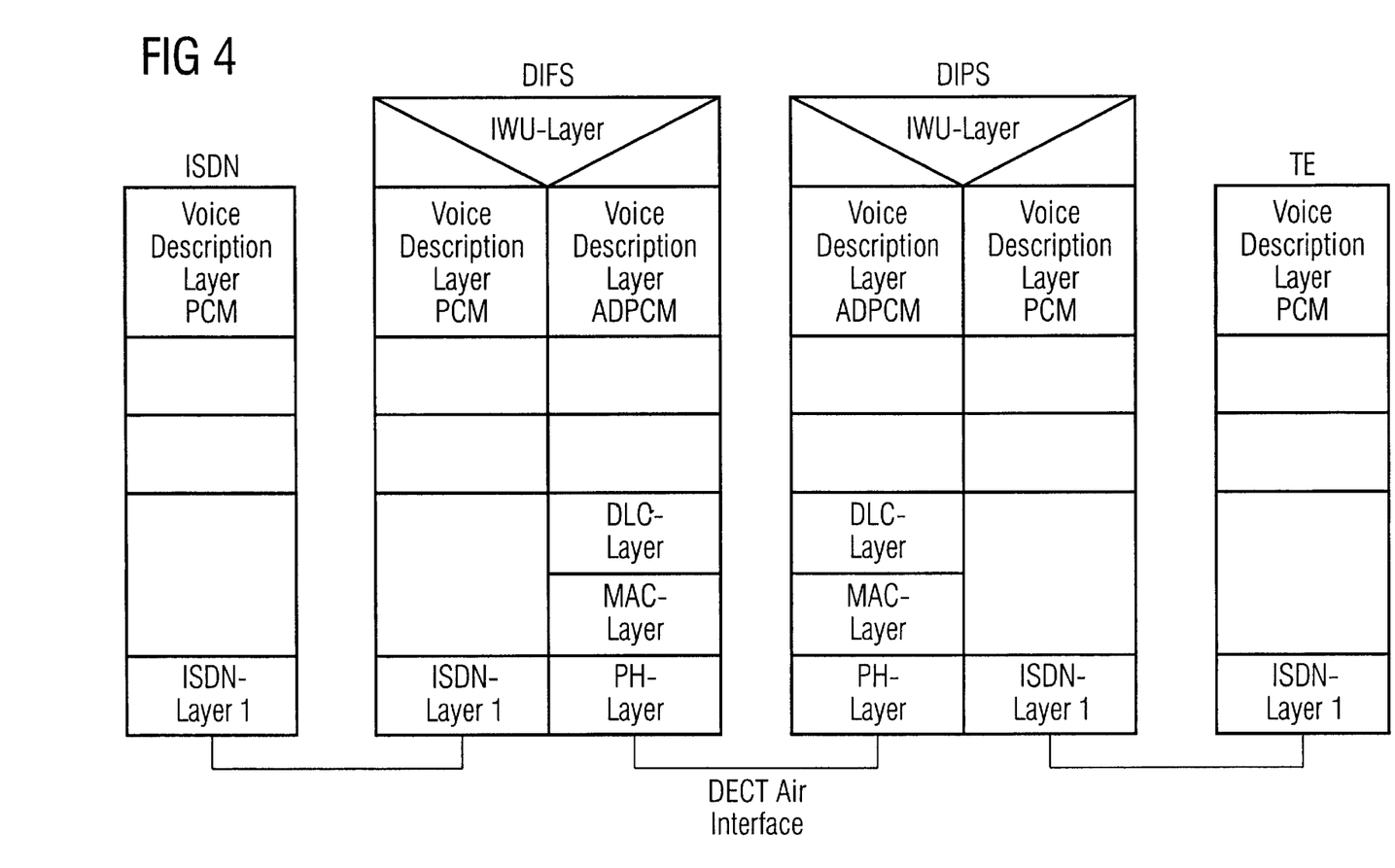
FIG. 4 depicts a model of he U-level for voice data transmission of the FIG. 1 ISDN-DECT-specific RLL/WLL telecommunication system.

On the basis of the OSI/ISO layer model (see (1): *Unterrichtsblätter—Deutsche Telekom,* Vol. 48, February 1995, pages 102 through 111; (2): *ETSI publication ETS* 300175-1 . . . 9. October 1992; (3): *ETSI publication ETS* 300102, February 1992; (4): *ETSI publication ETS* 300125, September 1991; (5): *ETSI publication ETS* 300012, April 1992), FIG. 4 shows a model of the U-level for voice data transmission of the "ISDN⇆DECT-specific RLL/WLL" telecommunication system IDRW-TS of FIG. 1 (see *ETSI publication prETS* 300xxx, Version 1.10, September 1996, Ch. 5, FIG. 4).

Proceeding from FIGS. 1 through 4, FIG. 5 shows a possible application of the hybrid telecommunication system according to FIG. 1. In accord therewith, and ISDN subscriber who would like to use his ISDN connection for data transmission (for example, in order to connect a personal computer to the Internet) should be able to set up a telecommunication connection therefor to the ISDN fixed network via the DECT/ISDN intermediate system DIIS. A DECT base station that comprises some kind of connection (for example, via a $S_0$ bus) to the ISDN network thereby serves as first telecommunication interface DIFS according to FIG. 1. The aforementioned personal computer with a PCMCIA card and a DECT radio part thereby serves as second telecommunication interface DIPS according to FIG. 1.

For the illustrated scenario, it is desirable to efficiently utilize the DECT channel resources and to efficiently utilize the DECT/ISDN protocol profile (see *ETSI publication prETS* 3000xxx, Version 1.10, September 1996) standardized for the ISDN transmission or a suitable DECT data transmission protocol profile.

In the DECT/ISDN intermediate system (DECT/ISDN protocol profile), it is possible to make, for example, an $S_0$ connection available to an ISDN subscriber wirelessly via a DECT air interface. Dependent on the ISDN-specific service (voice, data, etc.), a respective DECT radio channel is thereby set up for the ISDN D-channel and the two B-channels. A DECT traffic bearer in the "full slot format", i.e. 320 bits payload data per 10 ms or, respectively, per TDMA frame) [sic], is first set up for the ISDN D-channel. When ISDN B-channels are required for the ISDN connection, then a DECT traffic bearer in the "full slot format", i.e. 320 bits payload data per 10 ms or, respectively, per TDMA frame) [sic] or a DECT traffic bearer in the "double slot format" (800 bits payload data per 10 ms or, respectively, per TDMA frame) is set up per B-channel, dependent on whether, for example, voice data or video data are to be transmitted. The "full slot format" of the ISDN D-channel, however, is only required for the time in which a great number of ISDN signalling data must be transmitted.

This typically occurs at the start of a connection. It can be seen from this ISDN D-channel signalling whether the ISDN connection requires ISDN B-channels and how many it requires. Accordingly, one or two DECT traffic bearers are set up in the "double slot format" or, respectively, one or two double slots are occupied. When the data rate on the ISDN D-channel decreases, then the DECT traffic bearer in the "full slot format" is cleared down, and the signalling is continued in the A-field of one of the two DECT traffic bearers in the "double slot format". Unfortunately, this is not possible from the start since the data rate of the ISDN D-channel is higher than that in the A-field of a DECT traffic bearer. If it is found that the data rate in the ISDN D-channel is increasing again, the DECT traffic bearer in the "fill slot format" is also set up again for the ISDN D-channel as needed. The load of the DECT spectrum by the ISDN D-channel is to be minimized with this measure (see German Patent Application 19625142.7). When, however, such an ISDN connection has been set up vie the DECT air interface, then each of the ISDN B-channels occupies a "DECT double slot" (corresponding to 2 of 120 DECT channels), namely until the connection is in turn cleared down.

When it is a matter of ISDN connections wherein a continuous (steady) data stream (voice, video, modem) is transmitted, then a corresponding load of the DECT spectrum is justified.

At present, however, ISDN is being used more and more for a "true" protocol-controlled data transmission [for example, Internet coupling, "packet data" (discontinuous data stream)]. To this end, an ISDN controller that is connected to the personal computer occupies one or more ISDN B-channels for the entire time of a data transmission session (session). If such a session were transmitted via the DECT air interface, then the corresponding plurality of DECT channels would be accordingly occupied for the entire time of the session.

Investigations have shown, however, that the capacity possible with the ISDN B-channels during such a session is utilized to only approximately 5–10% over the full time of the session since the data transmission itself occurs in only a few brief moments.

Originally, the DECT data transmission protocol profiles were provided for such data transmission, but are not optimized—like the DECT/ISDN protocol profile—for the DECT-ISDN mode and are therefore unsuitable.

Since, however, an efficient utilization of the DECT spectrum is desirable (standardization), one would like to be able to apply one of the DECT data transmission protocol profiles for such "packet data" services but cannot agree on a appertaining physical data port.

SUMMARY OF THE INVENTION

The object underlying the invention is comprised is transmitting continuous and/or discontinuous data streams in a hybrid telecommunication system, particularly an "ISDN⇌DECT-specific RLL/WLL" system given minimal technical outlay, for example without respectively separate physical data ports (data inputs and data outputs) for the data streams.

In general terms the present invention is a method for the transmission of continuous and/or continuous data streams in a hybrid telecommunication system, particularly a "ISDN⇌DECT-specific RLL/WLL" system. The hybrid communication system contains a first telecommunication sub-system with at least one first telecommunication channel and a second telecommunication sub-system with a predetermined plurality of second telecommunication channels. The second telecommunication sub-system for the transmission of the data streams has a first telecommunication interface and a second telecommunication interface that are connected to one another via the second telecommunication channel or, respectively, channels. The second telecommunication sub-system, as local message transmission loop, is linked into the first telecommunication sub-system via the two telecommunication interfaces. The telecommunication interfaces analyze the data transmission situation on the first telecommunication channel or, respectively, channels and, dependent on this analysis, dynamically set up or clear down the second telecommunication channel or, respectively, channels such that the plurality of second telecommunication channels is minimal for the respective data transmission situation.

Advantageous developments of the present invention are as follows.

The first telecommunication sub-system functions according to the ISDN standard. The data transmitted on the first telecommunication channel or, respectively, channels are transmitted on an ISDN B-channel or, respectively, B-channels.

The second telecommunication sub-system functions according to the DECT standard. The data transmitted on the predetermined plurality of second telecommunication channels are transmitted on DECT channels.

The second telecommunication sub-system functions according to the GSM standard. The data transmitted on the predetermined plurality of second telecommunication channels are transmitted on GSM channels.

The second telecommunication sub-system functions according to the PHS system, a WACS system or a PACS standard. Data transmitted on the predetermined plurality of second telecommunication channels are transmitted on PHS, WACS or, respectively, PACS channels.

The second telecommunication sub-system functions according to the "IS-54" or PDC standard. The data transmitted on the predetermined plurality of second telecomuncation channels are transmitted on "IS-54" or, respectively, PDC channels.

The second telecommunication sub-system functions according to the CDMA, TDMA, and/or FDMA transmission principle. The data transmitted on the predetermined plurality of second telecommunication channels are transmitted on channels functioning according to the CDMA, TDMA, and/or FMDA transmission principle.

The first telecommunication interface and the second telecommunication interface function according to the DECT/ISDN intermediate standard.

Voice, video and/or modem data are allocated to the continuous data streams.

Packet data is allocated to the discontinuous data streams.

The present invention is also a telecommunication interface fro the transmission of continuous and/or discontinuous data streams in a hybrid telecommunication system, particularly a "ISDN⇌DECT-specific RLL/WLL" system. The hybrid telecommunication system contains a first telecommunication sub-system with at least one first telecommunication channel and a second telecommunication sub-system with a predetermined plurality of second telecommunication channels. The second telecommunication sub-system for the transmission of the data streams has a first telecommunication interface and a second telecommunication interface that are connected to one another via the second telecommunication channel, or respectively, channels. The second telecommunication sub-system, as local message transmission loop, is linked into the first telecommunication sub-system via the two telecommunication interfaces. A control module is provided that analyzes the data transmission situation on the first telecommunication channel or, respectively, channels and, dependent on this analysis, dynamically sets up or clears down the second telecommunication channel or respectively, channels such that the plurality of second telecommunication channels is minimal for the respective data transmission situation.

The idea underlying the invention is comprised in transmitting continuous and/or discontinuous data streams (for example, voice and video data/"packet data") in a hybrid telecommunication system, particularly an "ISDN⇌DECT-specific RLL/WLL" system according to FIG. 1, dependent on an [sic] analysis of the data transmission situation on a first telecommunication channel or, respectively, channels (for example, the ISDN B-channel or, respectively, channels) on a plurality of second telecommunication channels (for example, DECT channels) adapted to the analyzed data transmission situation.

In order to arrive at the corresponding channel plurality for each data transmission situation, the second telecommunication channels are dynamically set up or cleared down such that the plurality of second telecommunication channels is minimal.

The basis of this solution is an intelligent control module (for example, program-supported controller) at both sides of the DECT/ISDN transmission link that is optimized for an efficient utilization of the DECT spectrum—by ISDN B-channel management.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 5:
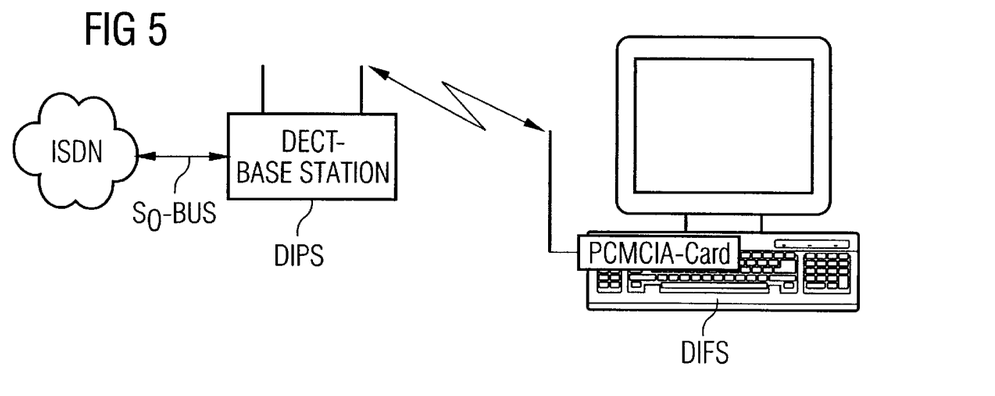
FIG. 5 depicts an application of the hybrid telecommunication system according to FIG. 1.
Figure 6:
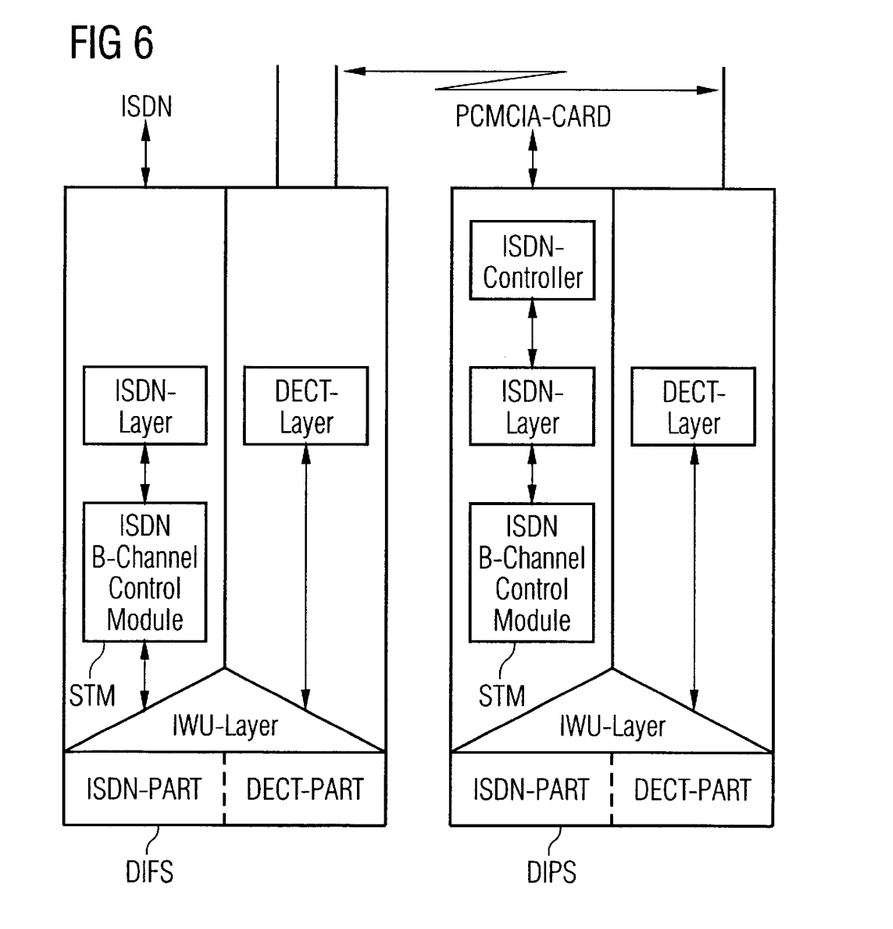
FIG. 6 depicts the DECT/ISDN protocol hierarchies for the two telecommunication interfaces of the present invention.

Proceeding from FIGS. 1, 4, 4 and 5, FIG. 6 shows the DECT/ISDN protocol hierarchies for the two telecommunication interfaces DIFS, DIPS according to FIG. 5. Both the DECT/ISDN protocol hierarchy of the first telecommunication interface DIFS as well as the DECT/ISDN protocol hierarchy of the second telecommunication interface DIPS comprises a control module STM fashioned as ISDN B-channel manager that, for example, is realized in the respective ISDN part for the physical and logical function control (as physical and logical function unit) between the IWU layer and the other, lower-ranking ISDN layers. The job (function) of the control module STM can be described as follows:

a) Exclusive utilization of the DECT/ISDN protocol profile (see *ETSI publication prETS* 300*xxx*, Version 1.0, September 1996): The ISDN B-channel manager controls the ISDN service to be supported. When it is a matter of packet data, then the ISDN B-channel manager initiates a dynamic setup and cleardown of ISDN B-channels dependent on whether data are pending for transmission or not. The DECT/ISDN intermediate system thereby automatically reacts with the corresponding setup and cleardown of DECT traffic bearers in the "double slot format" at the DECT air interface. This method has the advantage that the DECT/ISDN protocol profile can be utilized without modifications and additional implementations in the DECT part since the intelligence for the ISDN B-channel control lies in the ISDN part (ISDN controller).

b) Additional use of the DECT data transmission protocol profile: The method described under a) has a disadvantage: the occupied cannel capacity is still not minimal since, given the described packet data services, the data in most instances are sent only once from the one to the other side and vice versa but only seldom in both directions simultaneously. The DECT data transmission protocol profiles are customized for this type of transmission.

In addition to the DECT/ISDN protocol profile, a suitable DECT data transmission protocol profile is thus implemented in both telecommunication interfaces DIFS, DIPS. Dependent on the required data transmission rate, these DECT data transmission protocol profiles thus always activate a DECT traffic bearer in the "full slot format" or, respectively, a DECT traffic bearer in the "double slot format" whenever they are required and likewise only in the simplex transmission link (DIFS to DIPS or DIPS ro DIFS) where they are needed.

It is then the job of the ISDN B-channel manager to again decide which of the protocol profiles is applied for a transmission. It then implements a switching to DECT transmission according to the DECT data transmission protocol as soon as it is recognized that a packet data transmission is involved. In this version, the DECT part then controls the dynamic setup and cleardown of the DECT channels.

In both versions, of course, the ISDN B-channels of the ISDN connection from the DECT base station to the ISDN fixed network remain set up over the entire time of the session.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting at least one of continuous and discontinuous data streams in a hybrid telecommunication system, comprising the steps of:

providing a hybrid telecommunication system having a
first telecommunication sub-system with at least one first telecommunication channel and a second telecommunication sub-system with a predetermined plurality of second telecommunication channels;

providing in the second telecommunication sub-system for transmission of data streams a first telecommunication interface and a second telecommunication interface that are connected to one another via the at least one second telecommunication channel;

linking the second telecommunication sub-system, as local message transmission loop, into the first telecommunication sub-system via the first and second telecommunication interfaces;

analyzing in the first and second telecommunication interfaces a respective data transmission situation on the at least one first telecommunication channel; and effecting one of dynamically setting up and clearing down, dependent on this analysis, the at least one second telecommunication channel such that the plurality of second telecommunication channels is minimal for the respective data transmission situation.

2. The method according to claim 1, wherein the first telecommunication sub-system functions according to an ISDN standard, whereby data transmitted on the at least one first telecommunication channel is transmitted in at least one ISDN B-channel.

3. The method according to claim 1, wherein the second telecommunication sub-system functions according to a DECT standard, whereby data transmitted on the predetermined plurality of second telecommunication channels is transmitted on DECT channels.

4. The method according to claim 1, wherein the second telecommunication sub-system functions according to a GSM standard, whereby data transmitted on the predetermined plurality of second telecommunication channels is transmitted on GSM channels.

5. The method according to claim 1, wherein the second telecommunication sub-system functions according to one of a PHS system, a WACS system or a PACS standard, whereby data transmitted on the predetermined plurality of second telecommunication channels is transmitted on respectively one of PHS, WACS or PACS channels.

6. The method according to claim 1, wherein the second telecommunication sub-system functions according to one of a "IS-54" or PDC standard, whereby data transmitted on the predetermined plurality of second telecommunication channels is transmitted on respectively, one of "IS-54" or PDC channels.

7. The method according to claim 1, wherein the second telecommunication sub-system functions according to at least one of a CDMA, TDMA, and FDMA transmission principle, whereby data transmitted on the predetermined plurality of second telecommunication channels is transmitted on channels functioning according to respectively at least one of CDMA, TDMA, and FDMA transmission principle.

8. The method according to claim 3, wherein the first telecommunication interface and the second telecommunication interface function according to a DECT/ISDN intermediate standard.

9. The method according to claim 1, wherein at least one of voice, voice, video and modem data is allocated to continuous data streams.

10. The method according to claim 1, wherein packet data is allocated to discontinuous data streams.

11. A telecommunication interface for transmitting at least one of continuous and discontinuous data streams in a hybrid telecommunication system, comprising:

a hybrid telecommunication system having a first telecommunication sub-system with at least one first telecommunication channel and a second telecommunication sub-system with a predetermined plurality of second telecommunication channels;

the second telecommunication sub-system for the transmission of data streams having a first telecommunication interface and a second telecommunication interface that are connected to one another via at least one second telecommunication channel;

the second telecommunication sub-system, as local message transmission loop, being linked into the first telecommunication sub-system via the first and second telecommunication interfaces;

a control module for analyzing a data transmission situation on the at least one first telecommunication channel and whereby, dependent on this analysis, the control module dynamically setting up or clearing down the at least one second telecommunication channel such that the plurality of second telecommunication channels is minimal for the respective data transmission situation.

12. A telecommunication interface according to claim 11, wherein the first telecommunication interface and the second telecommunication interface function according to a DECT/ISDN intermediate standard.

* * * * *